United States Patent
Patel

(10) Patent No.: US 10,355,968 B2
(45) Date of Patent: *Jul. 16, 2019

(54) DIAGNOSIS OF A NETWORK ADAPTER DURING NETWORK OPERATION

(71) Applicant: International Business Machines Corporation, Armonk, NY (US)

(72) Inventor: Mehulkumar J. Patel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/922,468

(22) Filed: Oct. 26, 2015

(65) Prior Publication Data

US 2017/0019326 A1   Jan. 19, 2017

Related U.S. Application Data

(63) Continuation of application No. 14/797,236, filed on Jul. 13, 2015.

(51) Int. Cl.
*H04L 12/26* (2006.01)
*H04L 1/24* (2006.01)
*H04L 12/24* (2006.01)

(52) U.S. Cl.
CPC .............. *H04L 43/50* (2013.01); *H04L 1/243* (2013.01); *H04L 41/14* (2013.01); *H04L 43/0876* (2013.01)

(58) Field of Classification Search
CPC ...... H04L 43/50; H04L 45/18; H04L 43/0876
See application file for complete search history.

(56) References Cited

U.S. PATENT DOCUMENTS

| | | | |
|---|---|---|---|
| 7,477,847 B2 * | 1/2009 | Hofmeister | H04B 10/40 370/220 |
| 7,506,214 B2 | 3/2009 | Anglin et al. | |
| 8,006,133 B2 | 8/2011 | Cabezas et al. | |
| 2003/0223376 A1 * | 12/2003 | Elliott | H04J 3/14 370/249 |
| 2004/0143781 A1 * | 7/2004 | DiMambro | H04L 43/50 714/716 |

(Continued)

OTHER PUBLICATIONS

Github, "kohler/click," https://github.com/kohler/click/blob/master/drivers/e1000-4.x/src/e100_idiag.c.orig#L442 (created Nov. 22, 2002; printed Mar. 4, 2015 3:56 PM), 26 pgs.

(Continued)

*Primary Examiner* — Walter J Divito
*Assistant Examiner* — Anthony Luo
(74) *Attorney, Agent, or Firm* — Nolan M. Lawrence

(57) ABSTRACT

An adapter is configured to connect to a network. The adapter including a controller configured to receive a stream of network communication from a computer system physically connected to the adapter. The controller is further configured to detect a first identifier. The first identifier is related to a first communication unit of the stream of network communication. In response to detecting the first identifier, the controller is further configured to direct the first communication unit away from the network and back toward the controller through a loopback pathway. The controller is further configured to direct the stream of network communication away from the computer system and to the network.

7 Claims, 4 Drawing Sheets

(56) References Cited

U.S. PATENT DOCUMENTS

| | | | |
|---|---|---|---|
| 2005/0281392 A1* | 12/2005 | Weeks | H04L 43/50 |
| | | | 379/22 |
| 2007/0089009 A1* | 4/2007 | Nishizawa | G01R 31/31715 |
| | | | 714/738 |
| 2008/0274712 A1 | 11/2008 | Rofougaran | |
| 2010/0195512 A1 | 8/2010 | Harvey | |
| 2012/0294313 A1* | 11/2012 | Mitsuhashi | H04L 41/06 |
| | | | 370/401 |
| 2014/0129753 A1 | 5/2014 | Schuette et al. | |
| 2014/0244814 A1* | 8/2014 | Kuzmack | H04L 29/06006 |
| | | | 709/223 |
| 2015/0049023 A1 | 2/2015 | Wu et al. | |

OTHER PUBLICATIONS

Texas Instruments, "Industrial Temp, Single Port 10/100 Mb/s Ethernet Physical Layer Transceiver," SLLS931B—Aug. 2009—Revised Dec. 2009, 88 pages, © 2009, Texas Instruments Incorporated.

Patel, M., "Diagnosis of a Network Adapter During Network Operation," U.S. Appl. No. 14/797,236, filed Jul. 13, 2015.

List of IBM Patents or Patent Applications Treated as Related, Oct. 23, 2015, 2 pages.

* cited by examiner

DIAGNOSIS OF A NETWORK ADAPTER DURING NETWORK OPERATION

BACKGROUND

The present disclosure relates to diagnosing network adapters, and more specifically, to diagnosing network adapters during network operation.

Network adapters may be found in computers and mobile devices such as laptop computers and smart phones. Network adapters may also be found in other devices, such as storage devices and printers. Network adapters may provide access to a network. Network adapters may also enable computers to communicate with peripherals.

SUMMARY

Disclosed herein are embodiments of an adapter configured to connect to a network. The adapter comprises a controller configured to receive a stream of network communication from a computer system physically connected to the adapter. The controller is further configured to detect a first identifier. The first identifier is related to a first communication unit of the stream of network communication. In response to detecting the first identifier, the controller is further configured to direct the first communication unit away from the network and back toward the controller through a loopback pathway. The controller is further configured to direct the stream of network communication away from the computer system and to the network.

Also disclosed herein are embodiments of a method of testing a network adapter. A system connector of the network adapter receives a stream of network communication from a computer system. The system connector physically connects the computer system to the network adapter. The stream of network communication contains a first packet encoded with a loopback identifier. The network adapter detects the loopback identifier of the first packet. In response to detecting the loopback identifier, the network adapter directs the first packet from an output of a chip on the network adapter to an input of the chip. The stream of network communication is transmitted from the output of the chip to a network. The first packet is received from the input of the chip. The system connector transmits the first packet from the network adapter back to the computer system.

Also disclosed herein are embodiments of a system for testing an adapter on a network. A computer system is configured to host an application. The application is configured to generate a network communication stream. The network communication stream contains a plurality of network packets for other computers on the network and a network packet for the computer system. A network adapter driver is configured to differentiate the network packet from the plurality of network packets by encoding the network packet with a first identifier. A network interface chip is configured to receive the network communication stream from the computer system. In response to the first identifier, the network interface chip is configured to route the network packet to a local loopback pathway. The local loopback pathway leads to the computer system and away from the network. The network transceiver is configured to receive the plurality of network packets from the network interface chip and to transmit the plurality of network packets to the network.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
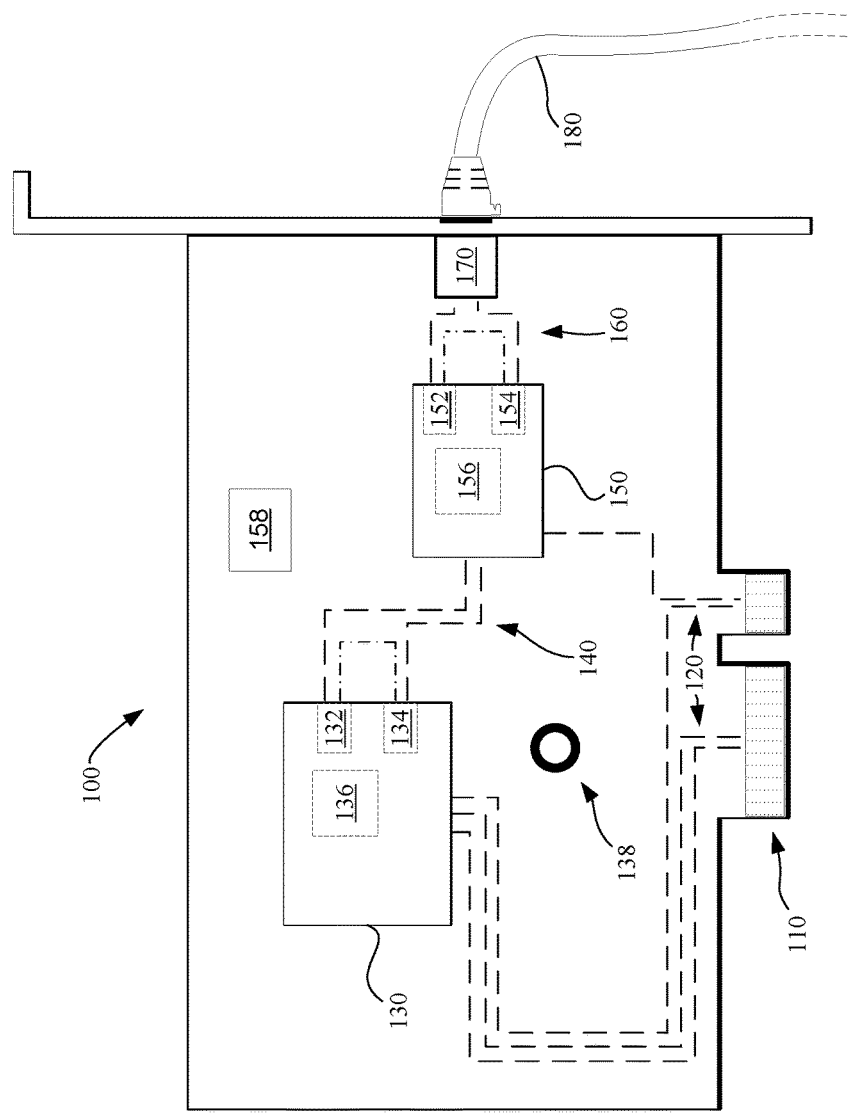
FIG. 1 depicts an example network adapter that may provide loopback testing concurrently with normal network traffic consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to diagnosing network adapters, more particular aspects relate to diagnosing network adapters during network operation. While the present disclosure is not necessarily limited to such applications, various aspects of the disclosure may be appreciated through a discussion of various examples using this context.

Network adapters may provide computers and other devices with the means to communicate with one another. Network adapters may provide connectivity to a local area network using one or more protocols, such as Ethernet or Wi-Fi. In some embodiments, network adapters may provide peripherals connectivity through one or more busses, such as a serial bus or a parallel bus. Network adapters may take the form of a dedicated daughter card with components dedicated to providing a network connection (e.g., a network interface card or network interface controller). A network adapter may take the form of a dedicated chip with other components that provide separate functions (e.g., a network chip on the mainboard of a smartphone). In some embodiments, network adapters may take the form of logic embedded into other multi-purpose chips (e.g., a network interface built into the south bridge chip of a motherboard of a desktop computer). In some embodiments, network adapters may be multiple components (e.g., a media access control connected to an external physical layer chip through a media-independent interface).

Network adapters may receive, alter, generate, and transmit communication units. In detail, network adapter may be comprised of one or more controllers that perform a variety of operations on a stream of communication. The stream of communication may be made of a variety of datagrams (e.g., data segments, data packets, packets, frames, headers, cells, chips, etc.). These controllers may operate by formatting, receiving, or sending the units of communication from the stream of communication. The units of communication may be data from one or more computer systems, such as network packets. The units of communication may be a portion of one or more layers of a network model (e.g., the datalink layer or the physical layer of the Open Systems Interconnection model). In some embodiments, the communication units may be generated by the controllers (e.g., the analog signals of the physical layer). To test the functionality of network adapters one or more loopback tests may be performed (e.g., datagrams are sent from the network adapter to itself and the computer analyzes the results of the sending and receiving of the datagrams to determine if the network adapter is operating properly).

Conventionally, to test the operation of a network adapter, the network adapter must be disconnected from the network. A hardware loopback test may be used to test and diagnose a network adapter. To utilize a hardware loopback test, a network cable may be disconnected from a port of the network adapter. A loopback device may connect the transmit wire of the port to the receive wire of the port such that the network adapter receives any communication unit it transmits. Unfortunately, the hardware loopback test requires a user to be physically present to perform the loopback test. The physical presence may cause a significant time delay before a network adapter may be diagnosed. In some situations, the physical presence requirement may make diagnosis of a network adapter impractical (e.g., a computer system located in a remote location). Additionally, while the network cable is disconnected the computer system may not be able to utilize the network adapter (e.g., to transmit communication units to other computers in the network).

Certain network adapters have implemented local loopback pathways that may enable a user to test a network adapter without having to physically disconnect a network cable. The local loopback pathways may be one or more network pathways implemented into the hardware of the network adapter. To utilize the loopback pathways a network adapter may have to be put into a test or diagnosis mode. While in diagnosis mode the network adapter directs all traffic through the loopback pathway. This diagnosis mode removes access of the normal pathway of network communication (e.g., only loopback packets may be sent to and received from the network adapter because the diagnosis mode removes network adapter from the network adapter's device driver).

There may be limited ways to work around a network adapter in a diagnosis mode. For example, computer systems may incorporate multiple network adapters so that one network adapter may operate in loopback mode while another provides network access to the computer system. Multiple network adapters, however, may require a larger desktop computer with multiple daughter card slots taking up valuable datacenter room. Multiple network adapters may also require multiple network cables and other associated hardware. This complexity reduces reliability. Another way to work around a network adapter in a diagnosis mode in data centers may be to provide redundant computer systems each having a network adapter, but this is also costly.

In some embodiments, a network adapter may be configured to provide loopback testing and diagnosis concurrently to normal network traffic. The network adapter may include one or more integrated circuits configured to determine that certain communication units (e.g., datagrams) are intended to be routed through a loopback pathway. The network adapter may also include one or more pieces of software that may flag certain communication units for loopback testing. The pieces of software may be device drivers operating at the kernel level in a computer system. In some embodiments, the pieces of software may be end-user applications operating at the user level in a computer system.

FIG. 1 depicts an example network adapter 100 that may provide loopback testing concurrently with normal network traffic consistent with embodiments of the present disclosure. The network adapter 100 may comprise the following: a system connector 110, a plurality of system pathways 120, a link-layer chip 130, a plurality of link-layer pathways 140, a physical-layer chip 150, a plurality of physical-layer pathways 160, and a network port 170. The network adapter 100 may be a network interface card that fits via the system connector 110 into a motherboard's daughter-card slot (not depicted) of a computer system (not depicted). In some embodiments, the network adapter may 100 be a network interface that is part of the computer system's motherboard. In some embodiments, the network adapter 100 may be a wireless network interface card.

The system connector 110 may comprise one or more physical contacts to electrically couple the network adapter 100 to the computer system. In some embodiments, the functionality provided by the link-layer chip 130 and the physical-layer chip 150 may be provided by the same integrated circuit. Where a singular integrated circuit may provide link-layer and physical-layer functionality, the link-layer pathways 140 and the physical-layer pathways 160 may be combined. In some embodiments where a singular integrated circuit may provide link-layer and physical-layer functionality, the link-layer pathways 140 and the physical-layer pathways 160 may be separate and operate independently. The link-layer chip 130 and the physical-layer chip 150 may route normal network traffic to and from the network adapter 100 concurrently with test traffic (e.g., any computer system using the network adapter for full network functionality may also be able to run one or more loopback tests at the same time).

The link-layer pathways 140 may include network routes between the link-layer chip 130 and the physical-layer chip 150, such as a transmit route and a receive route. The link-layer pathways 140 may include a local loopback pathway (e.g., a link-loopback route connecting the link-layer chip 130 to itself, a route connecting the transmit route and the receive route, etc.). The link-layer pathways 140 may utilize the link-loopback route to test functionality of the network adapter 100. The physical-layer pathways 160 may include network routes between the physical-layer chip 150 and the network port 170, such as a transmit route and a receive route. The physical-layer pathways 160 may include a local loopback pathway (e.g., a physical-loopback route from the physical-layer chip 160 to itself, a route connecting the transmit route and the receive route, etc.). The physical-layer pathways 160 may utilize the physical-loopback route to test functionality of the network adapter 100.

The network adapter 100 may enable a computer system (not depicted) to send data to other devices, such as desktop computers or remote storage. In detail, the network adapter may communicate with the computer system through the system connector 110. The computer system may send one or more communications, such as datagrams or instructions, to the link-layer chip 130 and the physical-layer chip 150 through the system pathways 120. The system pathways 120 may comprise one or more traces that electrically couple the system connector 110 to the rest of the network adapter 100. The flow of communication units may travel along the system pathways 120 to the link-layer chip 130. The flow of communication units may continue from the link-layer chip 130 along the link-layer pathways 140 to the physical-layer chip 150. The flow of communication may continue from the physical-layer chip 150 along the physical-layer pathways 160 to the network port 170. A network cable 180 may be physically plugged into the network port 170. The network cable 180 may connect the computer system to additional devices through a network (not depicted), such as a wired local area network. Where the network adapter 100 may be a wireless network interface card, the network port 170 may be a wireless network antenna and the network cable 180 may be replaced by a plurality of wireless networking signals.

The network adapter 100 may also provide the computer system with incoming communication from other device. The network adapter 100 may receive one or more datagrams from a second computer system through the network. For example, datagrams may arrive from the network through the network port 170, travel along the physical-layer pathways 160 and reach the physical-layer chip 150. The physical-layer chip 150 may send the datagrams along the link-layer pathways 140 to the link-layer chip 130. The link-layer chip 130 may send the datagrams along the system pathways 120 to the system connector 110 and to the computer system.

The link-layer chip 130 may comprise an output 132, an input 134, link-loopback logic 136, and link-layer accessories 138. The link-layer chip 130 may be configured to receive communication units from the computer system and from the network. The link-layer chip 130 may receive datagrams from the computer system by one or more pathways, such as the system pathways 120. The link-layer chip 130 may operate on communication units based on link layer communication (e.g., datagrams, serial bus packets, frames, media access control datagrams, communication units defined in the link layer of the TCP/IP model, communication units defined in the data link layer of the OSI model, etc.). The link-layer chip 130 may transmit to the network from the output 132. The link-layer chip 130 may receive from the network from the input 134. The link-layer accessories 138 may comprise additional components necessary for operation of the link-layer chip 130 (e.g., capacitors, resistors, memory chips, etc.).

The link-layer chip 130 may selectively route network traffic received from the computer system. In detail, the link-loopback logic 136 may read communication units from the computer system. The communication units may be sent individually from the computer system. In some embodiments, the communication units may be received as a stream of network communication from the computer system (e.g., one or more communication units). The communication units may be tagged with a flag and the link-loopback logic 136 may route the communication units based on the flag. For example, a first communication unit may have a first flag with the value "00". The value "00" may indicate that the first communication unit is normal network traffic. In response to reading the "00" value, the link-loopback logic 136 may instruct the output 132 to transmit the first communication unit to the physical-layer chip 150 through the link-layer pathways 140. In another example, a second communication unit may have a second flag with the value "01". The value "01" may indicate that the second communication unit is a link-layer test communication. In response to reading the "01" value, the link-loopback logic 136 may instruct the output 132 to transmit the second communication unit to the input 134 of the link-layer chip 130 by way of the link-loopback route of the link-layer pathways 140.

The physical-layer chip 150 may comprise a physical output 152, a physical input 154, a physical-loopback logic 156, and physical-layer accessories 158. The physical-layer chip 150 may be configured to receive communication units from the computer system and from the network. The physical-layer chip 150 may receive datagrams from the computer system by one or more pathways, such as the link-layer pathways 140. The physical-layer chip 150 may operate on communication units based on the physical layer communication (e.g., datagrams, voltages, frequencies, wireless signals, analog signals, physical datagrams, communication units defined in the link layer of the TCP/IP model, communication units defined in the physical layer of the OSI model, etc.). The physical-layer chip 150 may transmit to the network from the output 152. The physical-layer chip 150 may receive data from the network from the physical input 154. The physical-layer accessories 158 may comprise additional components necessary for operation of the physical-layer chip 150 (e.g., capacitors, resistors, memory chips, etc.) Where the functionality of the link-layer chip 130 and the physical-layer chip 150 are combined into one integrated circuit, the link-layer accessories 138 and the physical-layer accessories 158 may be combined as well.

The physical-layer chip 150 may selectively route network traffic received from the computer system. In detail, the physical-loopback logic 156 may read communication units from the computer system. The communication units may be sent individually from the computer system. In some embodiments, the communication units may be received as a stream of network communication from the computer system (e.g., one or more communication units). The communication units may be tagged with a flag and the physical-loopback logic 156 may route the communication units based on the flag. For example, a first communication unit may have a first flag with a value "00". The value "00" may indicate that the first communication units is normal network traffic. In response to reading the "00" value, the physical-loopback logic 156 may instruct the output 152 to transmit the first communication unit to the network port 170 through the physical-layer pathways 160. In another example, a second communication unit may have a second flag with the value "10". The value "10" may indicate that the second communication unit is a physical-layer test communication. In response to reading the "10" value, the physical-loopback logic 156 may instruct the output 152 to transmit the second communication unit to the input 154 of physical-layer chip 150 by way of the physical-loopback route of the physical-layer pathways 160.

In some embodiments, the physical-layer chip 150 may not receive any communication units with a value of "01" because this value may mean, as described above, that the communication is a link-loopback test and, therefore, is looped by the logic-layer chip in the link-loop back route of the link-layer pathways 140 and does not actually reach the physical-layer chip 150.

The computer system may receive both normal network traffic and test communications from the network adapter 100. For example, a first stream of network communication may include packets sent from the computer system to other devices by way of the network adapter 100. The first stream of network communication may also include test packets sent from the computer system that help diagnose the network adapter 100 (e.g., loopback packets for the data-link layer, loopback packets for the physical layer, interrupt request test packets, etc.). A second stream of network communication may include packets sent from other devices by way of the network adapter 100 to the computer system. The second stream of network communication may also include the test packets sent from the network adapter 100 to itself. The computer system may utilize one or more test packets to diagnose one or more functionalities of the network adapter 100 while continuing to communicate with the network attached devices.

Figure 2:
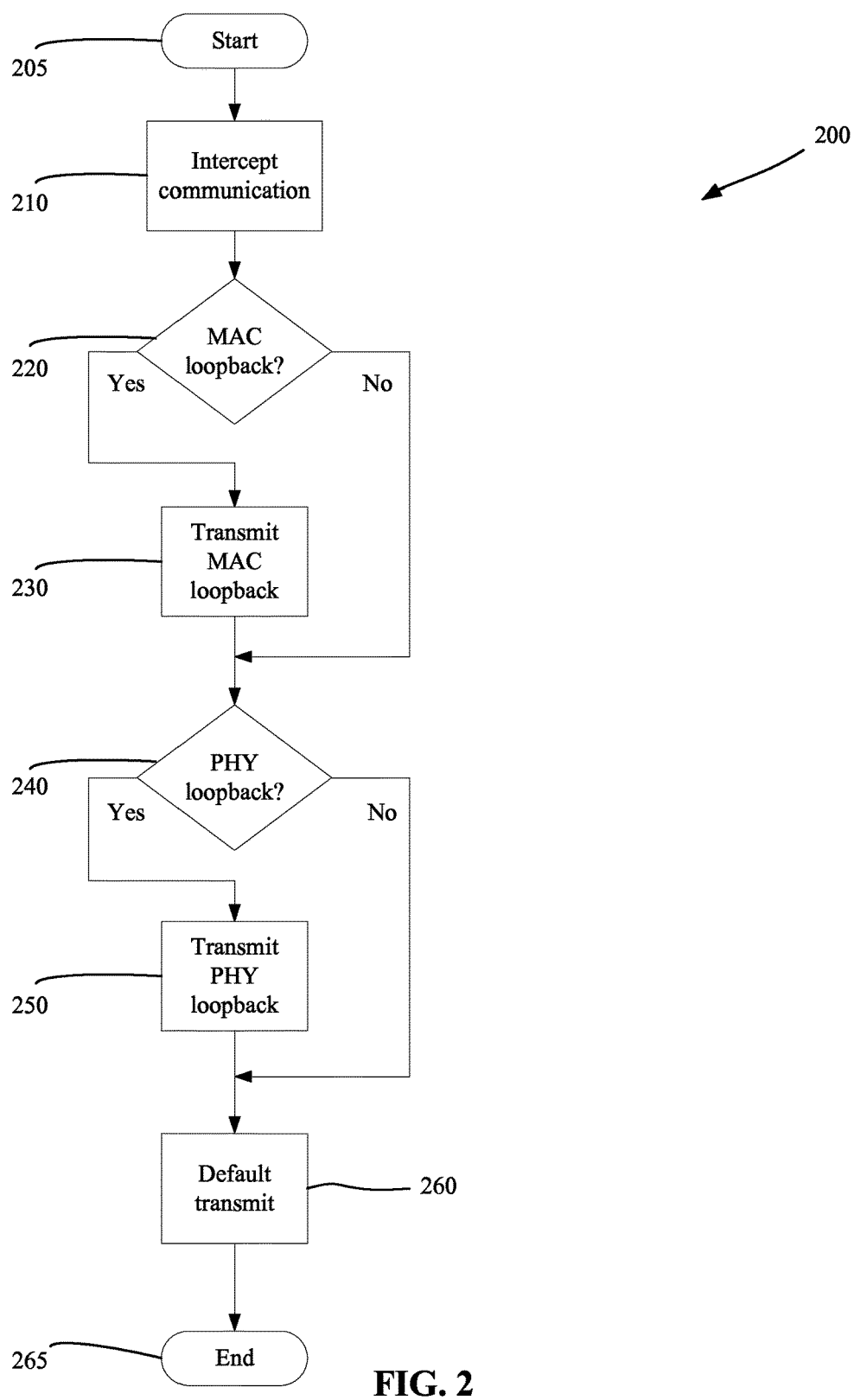
FIG. 2 depicts an example method for a network interface selectively routing traffic consistent with embodiments of the present disclosure.

FIG. 2 depicts an example method 200 for a network interface selectively routing traffic consistent with embodiments of the present disclosure. The method 200 may be executed by a network interface that is a component of a computer system. The network interface may be in the form of a controller in a network adapter. The controller may be an integrated circuited programmed to perform method 200. The controller may also perform other instructions or other methods not depicted by method 200. In some embodiments, the controller may be comprised of multiple integrated circuits, and certain segments of method 200 may be performed by the integrated circuits (e.g., a first integrated circuit may perform a first portion of method 200 and a second integrated circuit may perform a second portion of method 200). The controller may have normal input/output pathways for directing normal network traffic and loopback pathways for directing diagnosis network traffic. Method 200 may operate repeatedly to allow both normal network traffic and diagnosis network traffic to flow at the same time.

From start 205, the controller may intercept a stream of communication sent to the network adapter at 210. The stream of communication may include one or more datagrams sent to the network adapter from the computer system. The controller may inspect the datagrams to determine the presence of a media access control sub-layer test (MAC test) datagram at 220. The controller may determine the presence of a MAC test datagram based upon one or more values (e.g., an identifier, key, or flag) embedded into the datagram. The values may be embedded by a driver-level software program running on the computer system. The values may be in the form of decimal numbers (e.g., a '0' corresponding to no test necessary, a '1' corresponding to a first MAC test, a '2' corresponding to a second MAC test, etc.). In some embodiments, the values may be in the form of binary numbers (e.g., a "00" corresponding to no test necessary, a "01" corresponding to a first MAC test, a "10" corresponding to a second MAC test, etc.).

If the controller determines that a datagram in the stream of communication does contain a MAC test datagram, at 220, the controller may direct the MAC test datagram to be transmitted through a MAC loopback pathway at 230. The controller may direct the datagram to be transmitted to a certain pathway based on the presence of a value. In some embodiments, the controller may direct the datagram to be transmitted to a certain pathway based on the type of value (e.g., directing transmission to a first MAC loopback pathway based on a first test value, directing transmission to a second MAC loopback pathway based on a second test value, etc.). In some embodiments, the controller may determine the presence of multiple MAC test datagrams at 220, and may direct the multiple MAC test datagrams to be transmitted through the MAC loopback pathway at 230.

If the controller determines that a datagram in the stream of communication does not contain a MAC test datagram, at 220 (alternatively after all MAC test datagrams are transmitted at 250), the controller may determine the presence of a physical layer test (PHY test) datagram at 240. The controller may determine the presence of the PHY test datagram based upon the one or more values embedded into the datagram by the driver-level software program. The values may be in the form of decimal numbers (e.g., a '3' corresponding to a first PHY test, a '4' corresponding to a second PHY test, etc.). The values may be in the form of binary numbers (e.g., a "00" corresponding to a no test necessary, a "11" corresponding to a first PHY test, etc.).

If the controller determines that the datagram in the stream of communication contains a PHY test datagram, at 240, the controller may direct the datagram to be transmitted through a PHY loopback pathway at 250. The controller may directed the datagram to be transmitted to a certain pathway based on the presence of a value. In some embodiments, the controller may direct the datagram to be transmitted based on the type of value. In some embodiments, the controller may determine the presence of multiple PHY test datagrams at 240, and may direct the multiple MAC test datagrams to be transmitted through the MAC loopback pathway at 250.

If the controller does not determine that a datagram in the stream of communication contains a PHY test datagram, at 240 (alternatively after all PHY test datagrams are transmitted at 250), the controller may direct the stream of communication through a default pathway of the network adapter at 260. In some embodiments, because the controller routed MAC test datagrams through the MAC loopback pathway or routed PHY test datagrams through the PHY loopback pathway, at 230 and 250 respectively, those test datagrams may no longer be a part of the stream of communication that is transmitted through the default pathway at 260. The default pathway may be a transmission pathway of the network adapter that leads to a network, such as a local area network. Method 200 may be performed on a per communication unit basis, with each communication unit of the stream of communication undergoing operations 210-216 as applicable. After the stream of communication is directed to default transmit, at 260, the method ends at 265.

Figure 3:
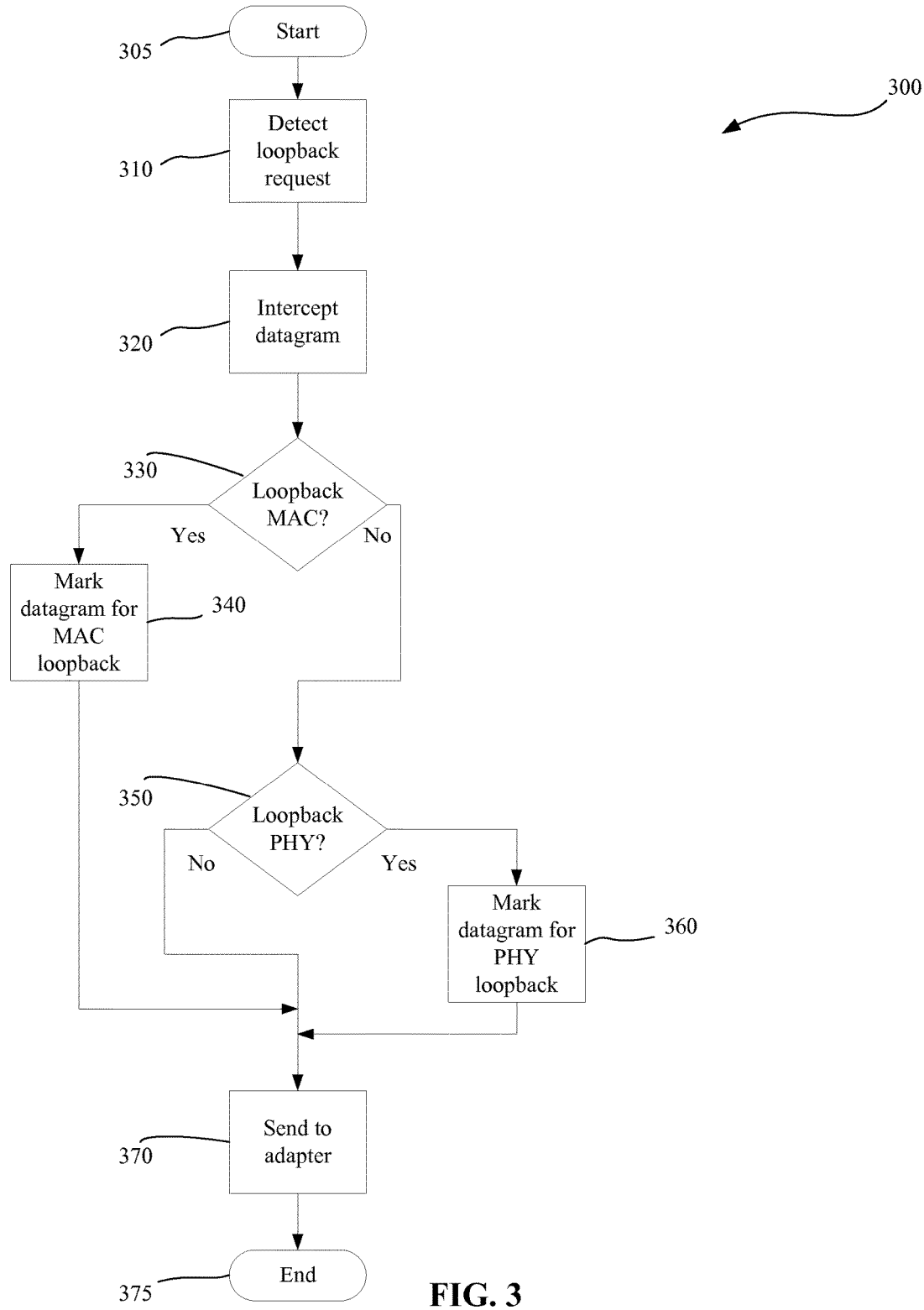
FIG. 3 depicts an example method to indicate a datagram for testing consistent with embodiments of the present disclosure.

FIG. 3 depicts an example method 300 to indicate a datagram for testing consistent with embodiments of the present disclosure. Method 300 may be executed by a software program running on a computer system with a network adapter consistent with embodiments of the disclosure. For example, the software program may be a device driver, and the network adapter may be an on-board network interface that receives instructions from the device driver. The program may also perform other methods. In some embodiments, parts or all of method 300 may be executed by more than one program. The software program may indicate a datagram for testing in a format consistent with a network adapter configured to perform tests based on the indication.

From start 305, the program may detect a loopback request at 310. The loopback request may come from a user level program, such as a web-browser. The loopback request may come from an operating-system level program, such as a kernel utility. The loopback request may be in the form of a datagram directly given to the program (e.g., a datagram transmitted directly from a kernel utility). In some embodiments, the loopback request may be in the form of a datagram indirectly given to the program (e.g., a pointer from a kernel utility indicating a datagram that should be altered).

At 320 the program may intercept a datagram for alteration. In some embodiments, the program may intercept a datagram directly (e.g., all streams of network communication are given to the driver and the driver must process them as they are received from the computer system). In some embodiments, the program may intercept the datagram indirectly (e.g., all streams of communication are placed into one or more network queues from software running on the computer system and the device driver operates upon the queues). Where the program may intercept the datagram indirectly, the program may remove the datagram from any queue to prevent the datagram from being processed by the network adapter before the program can alter the datagram.

At 330 the program may determine whether the loopback request is a MAC loopback request. The program may receive a single request at 310 from which to make the determination at 330 (e.g., an ioctl system call indicating that a MAC loopback test should be performed on a first packet). In some embodiments, the program may receive multiple requests at 310 from which to make the determination at 330 (e.g., a first system call indicating a first packet should be altered and a second system call indicating that the first packet should be flagged for MAC loopback testing).

If the program determines that the loopback request is a MAC loopback request, at 330, the program may mark the datagram for MAC loopback at 340. The program may mark the datagram in a format consistently with the logic for decoding the datagrams encoded into the network adapter. The program may mark the datagram for MAC loopback by directly altering the datagram (e.g., appending a value to the front of the datagram, appending a value to the end of the datagram). The program may mark the datagram for MAC loopback indirectly (e.g., the queue of datagrams has a data field and a descriptor field and the program alters the descriptor field such that the network adapter may view the descriptor field and understand how to route the datagram based on the descriptor field).

If the program determines that the loopback request is not a MAC loopback request, at 330, the program may determine whether the loopback request is a PHY loopback request at 350. The program may receive one or more request at 310 from which to make the determination at 350. If the program determines that the loopback request is a PHY loopback request, at 350, the program may mark the datagram for PHY loopback at 360. The program may mark the datagram for PHY loopback in a format consistently with logic for decoding the datagrams encoded into the network adapter. After the program marks the datagram for MAC loopback at 340 (alternatively marks the datagram for PHY loopback at 360) the program may send the datagram to the network adapter at 370. The program ends at 375. If the program alters datagrams indirectly through modification of a queue, step 370 may comprise reinserting the modified datagram into the queue for the network adapter to retrieve.

Figure 4:
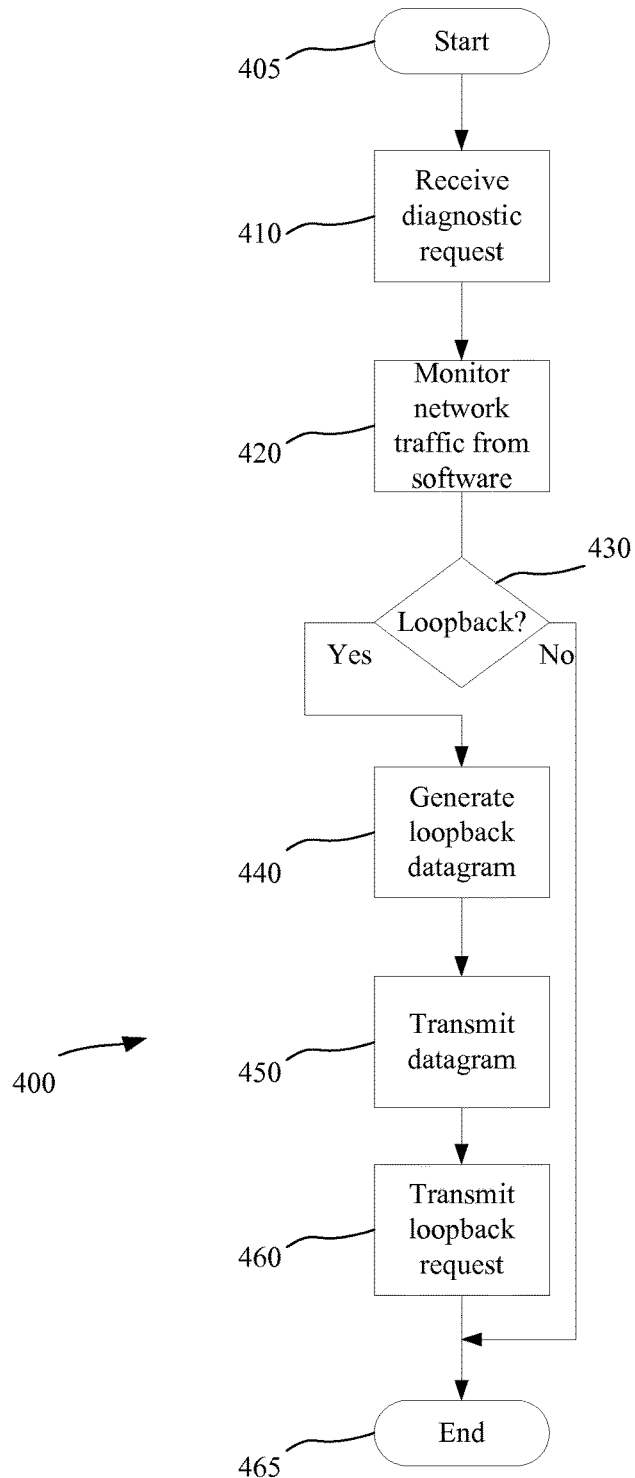
FIG. 4 depicts an example method to generate datagrams for loopback testing consistent with embodiments of the present disclosure.

FIG. 4 depicts an example method 400 to generate datagrams for loopback testing consistent with embodiments of the present disclosure. Method 400 may be executed by a software program running on a computer system with a network adapter consistent with embodiments of the disclosure. The program may communicate with other components of the computer system, such as the operating system through native software calls or the network adapter device driver through system calls. The program may generate a datagram in a format consistent with a format the network adapter is configured to recognize to perform tests with the datagram.

From start 405, the program may receive a request from the user to diagnose the network adapter at 410. The request may instruct the program on the type of network traffic to utilize for network traffic (e.g., network traffic sent to specific address, network traffic sent to a specific program, packets sent to the "127.0.0.1" localhost). The program may monitor the operating system of the computer system for network traffic 420 matching the type in the request.

The program may determine whether a packet is a loopback eligible packet at 430. At 430 the program may determine loopback edibility based on the criteria from the request provide at 410. If the program determines that a packet is loopback eligible, at 430, the program may generate a loopback datagram at 440. The loopback datagram may be generated based on the detected packet (e.g., the datagram may be a copy of the packet). The loopback datagram may be generated based on criteria received in the diagnostic request (e.g., the datagram may contain a header from the packet and a payload from the diagnostic request).

At 450 the program may transmit the datagram to the network adapter. The datagram may be transmitted directly to a device driver of the network adapter. In some embodiments, the datagram may be transmitted indirectly to the device driver, such as by placing the datagram into an outbound network queue to be read by the network adapter. At 460 the program may instruct the network adapter to perform a loopback test by transmitting a loopback request to the device driver. If the program does not determine that a packet is loopback eligible, at 430 (alternatively after transmitting a loopback request to the device driver), the program ends at 465.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of testing an internal network adapter daughter card, the method comprising:
   receiving, via a daughter card system connector directly connecting a computer system to the network adapter daughter card, a stream of network communication from the computer system, the stream of network communication containing a first packet encoded with a loopback identifier;
   detecting, by the network adapter daughter card, the loopback identifier of the first packet;
   directing, from an output of a chip on the network adapter daughter card and in response to the detecting the loopback identifier, the first packet to an input of the chip on the network adapter daughter card along a local loopback pathway;
   transmitting, from the output of the chip and along a network pathway, the stream of network communication to a network port, the network port connecting the computer system via the network adapter daughter card to a network, wherein the network pathway is separate from the local loopback pathway, wherein the local loopback pathway is entirely internal to the computer system;
   receiving, from the input of the chip, the first packet; and
   transmitting, via the system connector, the first packet from the network adapter daughter card back to the computer system.

2. The method of claim 1 further comprising:
   performing, by the computer system, a loopback test in response to receiving the first packet back from the network adapter daughter card.

3. The method of claim 2, wherein the loopback test is selected from the group consisting of a data link layer test, a physical layer test, a media access control test, and an interrupt test.

4. The method of claim 1, wherein the stream of network communication is generated from a user level application, and wherein the first packet is encoded by a system level application.

5. A method of concurrently testing network functionality and performing network communication, the method comprising:
   receiving a stream of packets from a computer system from physical traces of a mainboard of the computer system that communicatively couple a computer system to a network adapter integrally affixed to the mainboard along a system pathway;

sending, based on the stream of packets, a plurality of network packets along a network pathway to a wireless network port that communicatively couples the network adapter to a network of one or more additional devices; and routing, based on a first identifier in the stream of packets and contemporaneously with the sending of the plurality of network packets, a test network packet to a loopback pathway separate from the network pathway, wherein the loopback pathway is entirely internal to the computer system.

6. A method of testing network functionality concurrently with active network traffic, the method comprising:

receiving, by a controller of a network adapter, a stream of network communication from a desktop operating system of a desktop computer directly connected to the network adapter along a plurality of pathways of an adapter card slot of the desktop computer;

detecting, by the controller, a first identifier related to a first communication unit of the stream of network communication, wherein the first identifier is embedded into the stream of network communication before being received by the network adapter;

directing, by the controller and in response to the detecting the first identifier, the first communication unit away from the network and back toward the desktop computer through a local loopback pathway, wherein the local loopback pathway is entirely internal to the desktop computer; and directing, by the controller the stream of network communication away from the desktop computer and to the network through a wireless network port of the network adapter through a network pathway, wherein the network pathway is separate from the local loopback pathway.

7. The method of claim 6, wherein the local loopback pathway is configured to only send loopback test packets, and wherein the method further comprises:

receiving, by the controller and based on the directing the first communication unit toward the desktop computer through a local loopback pathway, a second stream of network communications directly from the desktop computer;

detecting, by the controller, a second identifier related to a second communication unit in the second stream of network communication, wherein the second identifier is embedded into the second stream of network communication before being received by the network adapter; and directing, by the controller and in response to the detected second identifier, the second communication unit away from the network and back toward the desktop computer through a second local loopback pathway, wherein the second local loopback pathway is separate from the local loopback pathway and wherein the second local loopback pathway is separate from the network pathway.

\* \* \* \* \*